(No Model.)

S. D. MORTON
ANIMAL TRAP.

No. 524,425. Patented Aug. 14, 1894.

Witnesses.
Chas. W. Parker.
J. S. Barker.

Inventor.
Samuel D. Morton,
by Charles & William B. King
Attys.

UNITED STATES PATENT OFFICE.

SAMUEL D. MORTON, OF HEBER, ARKANSAS.

ANIMAL-TRAP.

SPECIFICATION forming part of Letters Patent No. 524,425, dated August 14, 1894.

Application filed May 26, 1894. Serial No. 512,521. (No model.)

*To all whom it may concern:*

Be it known that I, SAMUEL D. MORTON, a citizen of the United States, residing at Heber, in the county of Cleburne and State of Arkansas, have invented certain new and useful Improvements in Animal-Traps; and I do hereby declare the following to be a full, clear, and exact description of the invention, such as will enable others skilled in the art to which it appertains to make and use the same.

My invention relates to animal traps of the cage or box variety and it has for its object to construct the entrance to the trap in such shape and of such material that the animal will readily enter the trap.

Figure 1:
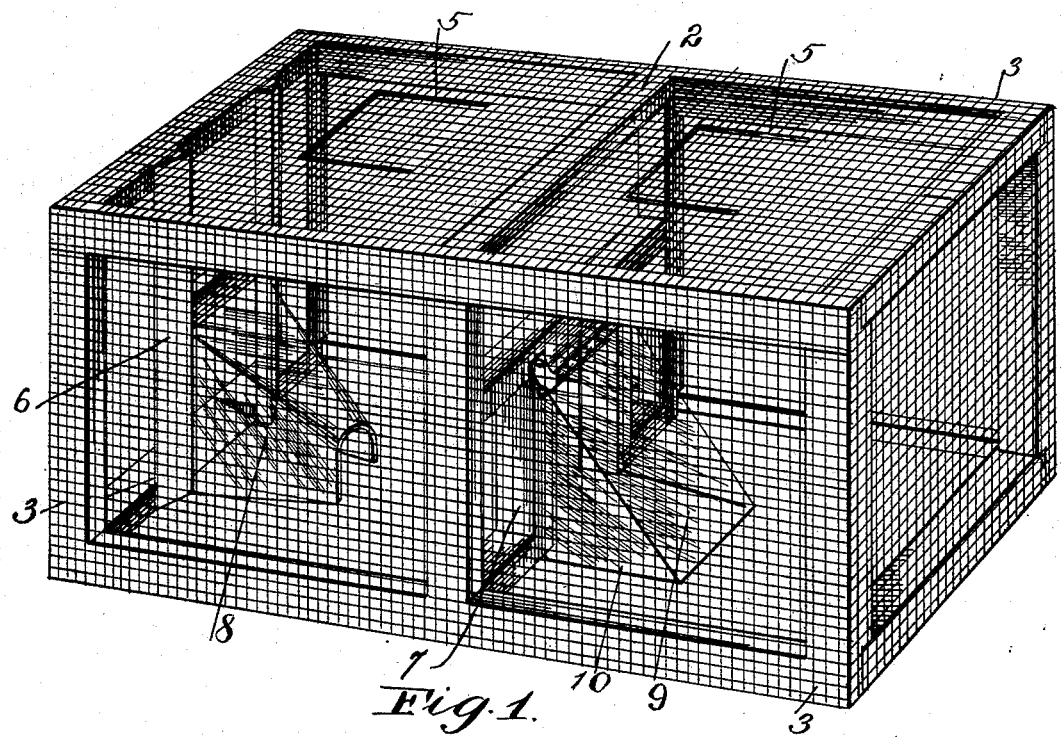
Figure 2:
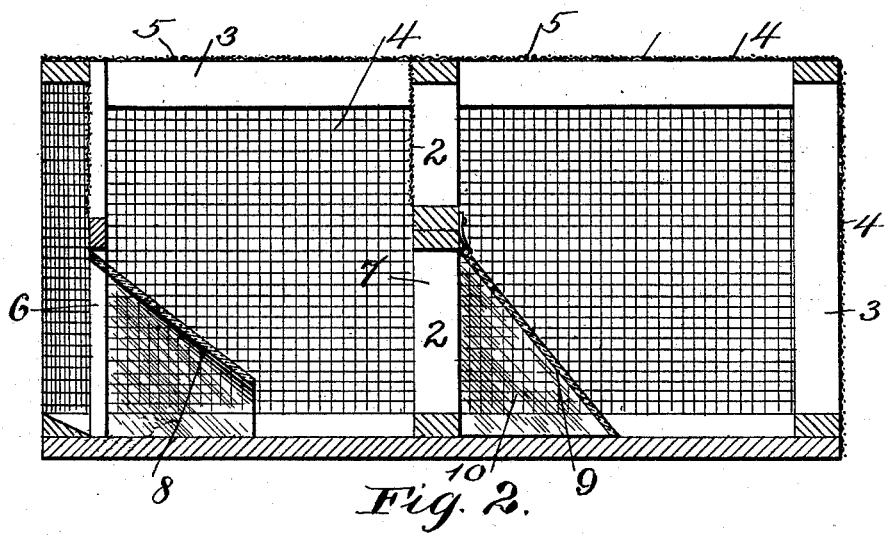

In the drawings, wherein the preferred form of my invention is illustrated,—Figure 1 is a perspective view of a trap embodying my improvements. Fig. 2 is a central longitudinal section.

The body of the trap may be of any usual or approved shape and is preferably divided into two compartments by a central partition 2. The frame-work 3 of the body of the trap may be of wood or metal, the latter material being employed when it is intended to trap those animals which would gnaw or otherwise readily destroy a wooden frame-work. This frame-work is preferably covered by wire netting of suitable strength and size of mesh, as indicated at 4.

Suitable openings 5 are made through the netting, preferably through the top, and these are closed by gates whereby entrance may be had to the several compartments, so as to remove the game entrapped.

The frame-work at one end of the trap, hereinafter referred to as the forward end, is so constructed as to form an open doorway 6, another doorway 7 being formed through the central partition 2. An entrance way 8 extends from the opening 7 inward into the first compartment of the trap. This tube is formed of some transparent material, preferably of clear glass, and is of tapering archshape. I prefer that the bottom of the way should be open and rest directly upon the bottom of the trap, or on the earth, when the trap has no bottom as the animal is more likely to enter the trap when the entrance is thus constructed, than it would be were the animal required to tread on the glass of the entrance before it is secured within the trap.

It is well known that an animal is easily frightened and prevented from entering the trap if the entrance appears to be obstructed, or if the gate or other obstruction to the entrance be of such a character that the animal must press directly against it. Having these facts in view I construct the entrance way 8 of transparent material so that the animal as it approaches the trap, cannot well see the way; and I make it of the shape shown so that as the animal passes through the doorway, his sides and back, which are usually protected with fur, are the only parts of his body which brush against the smooth sides of the entrance. The sensation produced by thus brushing against the entrance way is not of such character as to excite alarm and the animal readily enters the trap. Having once entered the first chamber of the trap, the liability of escape is small because, from the entrance way being transparent, the animal seeks to pass out through the sides of the way and meeting with an obstruction, becomes confused and excited.

The swinging door or gate which closes the entrance between the two compartments of the trap is of peculiar construction. It is designated by 9 and consists of an inclined plate hinged to the frame-work above the door-way, and provided along its edges with the wings, 10. This gate is made of transparent material. The reasons for making this gate as described are similar to those heretofore referred to for making the entrance way of the same material, that is to say, it does not appear to close the gateway, permitting the animal to see readily from the first into the second compartments, and at the same time the gate does not oppose an obstruction directly to the front or face of the animal and thus frighten it when an attempt is made to pass through the opening. The excited animal in the front compartment readily passes through the opening 7 and attempts to press under the obstructing gate which rises and allows him to pass into the second compartment, when the gate closes behind the animal by gravity. The animal being once trapped within the second compartment cannot escape.

The trap which I have described is adapted for use in trapping fish as well as for trapping land animals. When used as a fish trap it may have to be modified somewhat in construction but the essential features of the invention will be maintained.

I am aware that it is not new to construct an animal trap entirely of glass; nor is it new to make a swinging or flap-door for such a trap of glass, and hence I do not claim these old features as part of my invention.

What I claim is—

1. In an animal trap, an entrance of tapering, arch form and constructed of transparent material, substantially as set forth.

2. In an animal trap, an entrance way 8, of transparent material of tapering arch form, and open at the bottom, substantially as and for the purposes set forth.

In testimony whereof I affix my signature in presence of two witnesses.

SAMUEL D. MORTON.

Witnesses:
W. B. SMITH,
S. PERRY.